April 4, 1939.  G. BROULHIET  2,153,498
VEHICLE UNDERFRAME
Filed Aug. 12, 1933  3 Sheets-Sheet 1
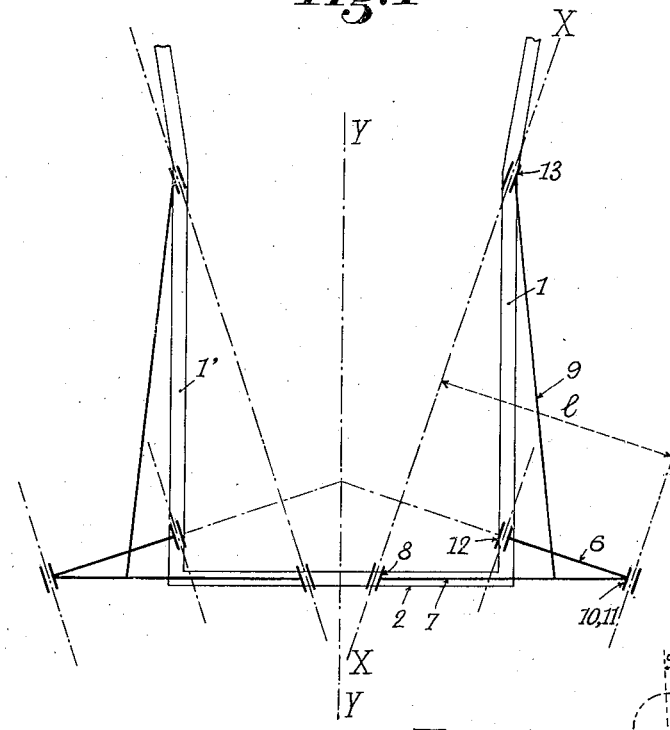
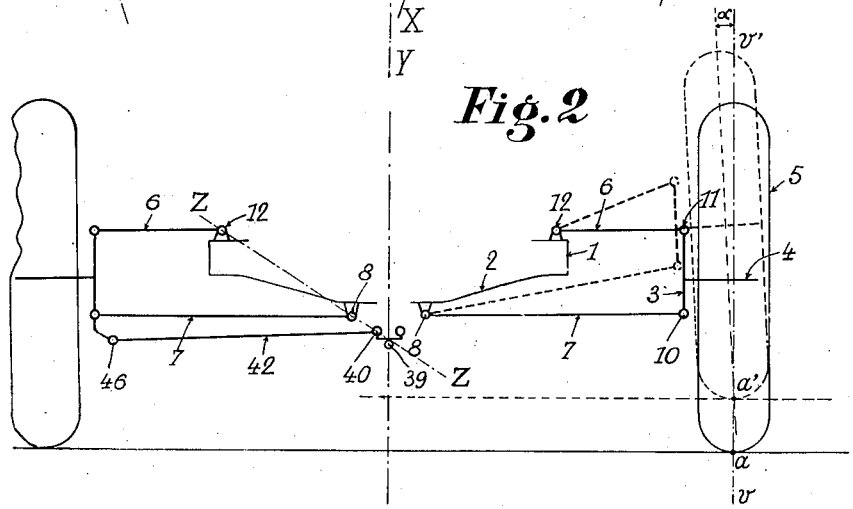
G. Broulhiet
INVENTOR
By Marks & Clerk April 4, 1939.   G. BROULHIET   2,153,498
VEHICLE UNDERFRAME
Filed Aug. 12, 1933   3 Sheets-Sheet 2

G. Broulhiet
INVENTOR
By Marks & Clerk
Attys.

April 4, 1939.    G. BROULHIET    2,153,498
VEHICLE UNDERFRAME
Filed Aug. 12, 1933    3 Sheets-Sheet 3

G. Broulhiet
INVENTOR
By Marks & Clerk
Attys.

Patented Apr. 4, 1939

2,153,498

UNITED STATES PATENT OFFICE 2,153,498

VEHICLE UNDERFRAME

Georges Broulhiet, Paris, France, assignor to Robert C. Watson and Jennings Bailey, Jr., trustees, both of Washington, D. C.

Application August 12, 1933, Serial No. 684,900
In France March 16, 1933

6 Claims. (Cl. 280—124)

The present invention relates to a vehicle underframe for motor vehicles provided with front steering wheels having independent spring suspension, that is, in which the vertical movements of the right and left hand wheels, which are caused by irregularities in the road surface, are independent.

The invention has for its object to improve the road conditions of vehicles provided with suspension arrangements of this class, to afford increased safety when running, and to render the vehicle more comfortable by reason of the use of a very flexible suspension arrangement for the front wheels.

Great technical difficulties are raised by the practical obtainment of these conditions, in particular, the devices connecting the wheels with the vehicle frame must be theoretically designed in such manner as to maintain a practically constant value for the wheel gauge or the distance between the mean points of contact of the pneumatic tyres with the ground, in order to avoid lateral friction and hence the rapid wear of these pneumatic tyres upon the ground at each vertical movement; but this result can only be obtained, and in fact in an approximate manner, by connecting the members carrying the journals with the vehicle frame by links or analogous members, certain of which must have a relatively great length, which is incompatible with the available space on the side of the vehicle frame or below this latter.

On the other hand, during its displacements, the wheel must remain constantly parallel with a reference plane, in order to avoid any torque of gyrostatic precession, that is, to maintain a constant downward setting of the axle.

Also the wheel base should remain practically constant, that is, the mean point of contact of a front wheel with the ground should not be displaced with reference to the corresponding rear wheel.

The steering gear should not be affected by the independent vertical movements of the wheels. This is not the case in the known constructions, in which the usual coupling bar is inclined with reference to the vehicle frame during the unequal vertical movements of the two wheels, and thus causes a variation of the angle of forward convergency of the front wheels.

The invention essentially consists of an arrangement which comes very near the theoretical conditions to be fulfilled by an ideal suspension, by the use of a construction which can be readily adapted to vehicle frames of the current type.

The different features of the invention are set forth in the following description with reference to the accompanying drawings.

Fig. 1 is a diagrammatic plan view of the arrangement in conformity with the invention.

Fig. 2 is a diagrammatic elevational view of the spring suspension.

Figure 3:
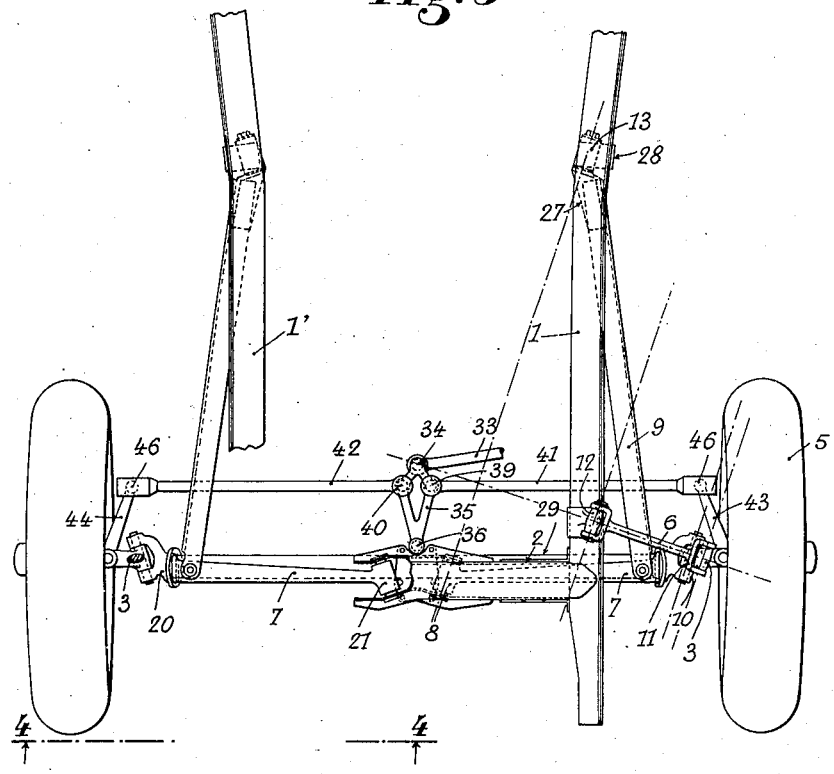
Fig. 3 is a plan view, with part of the front left-hand part of the vehicle frame broken away, of a practical embodiment of the invention.
Figure 5:
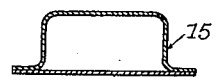
Fig. 5 is a section on the line 5—5 of Fig. 4.
Figure 6:
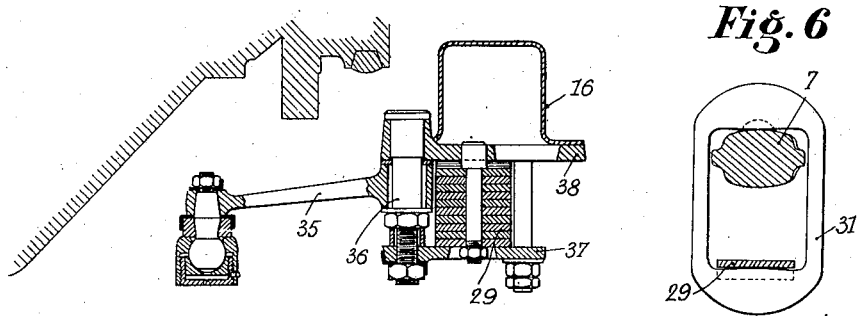
Fig. 6 is a section on the line 6—6 of Fig. 4.
Figure 4:
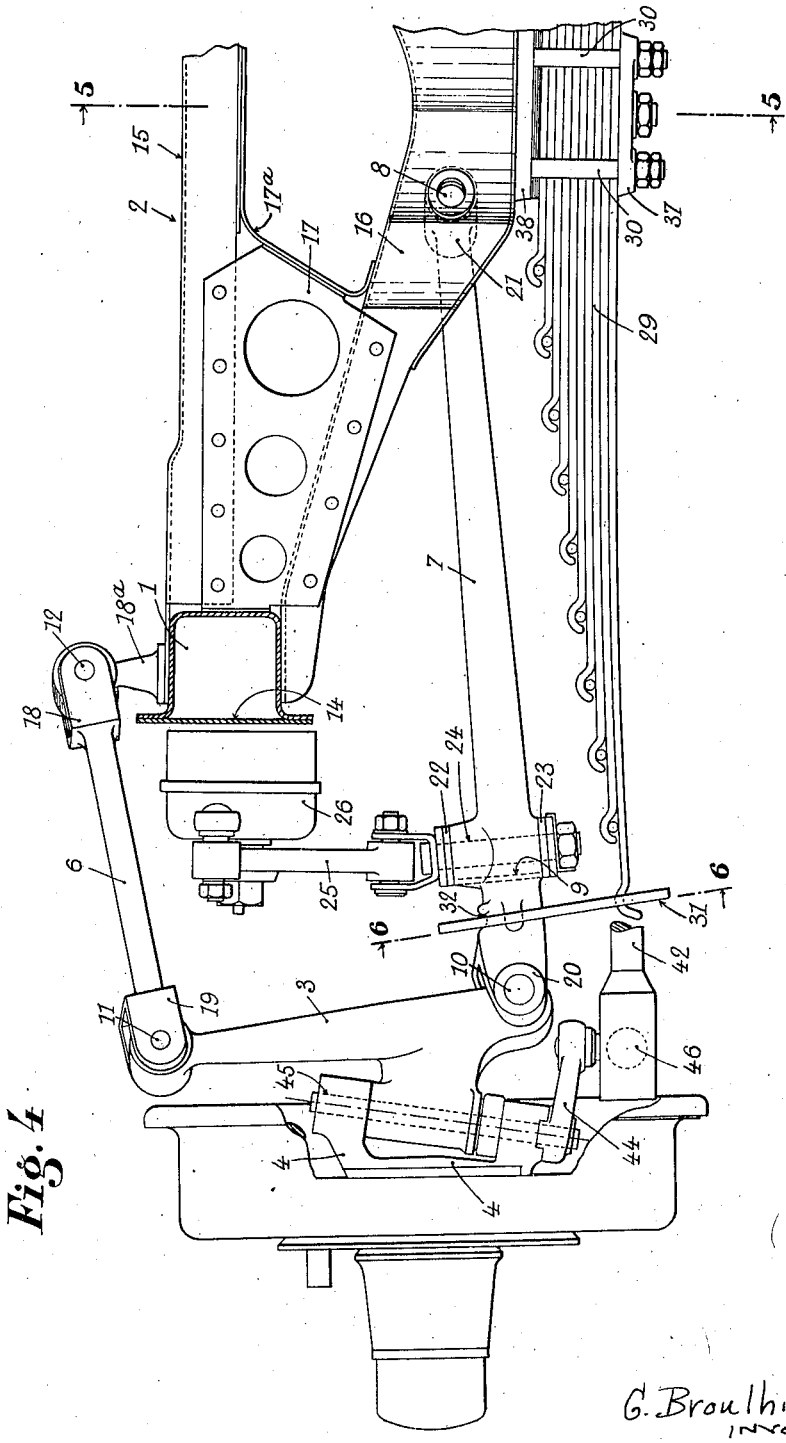
Fig. 4 is a section on the line 4—4 of Fig. 3.

In Figs. 1 and 2, $1$—$1'$ are the side members of the vehicle frame, 2 is the front cross member, 3 the member carrying the journal, and 4 the journal, these being shown in a very diagrammatic manner. The problem consists in connecting the member 3 with the vehicle frame in such manner that during the vertical motion of the wheel 5, the point of contact of the pneumatic tyre $a$ with the ground, which is considered as invariably connected with the tyre, will move practically according to the vertical line $vv'$, in order to avoid all lateral motion of the tyre upon the ground.

Constructions are already known by which this result can be approximately obtained, and herein the member 3 is connected with the frame by the two links or similar elements 6—7, the upper link 6 being shorter than the lower link 7. Owing to the difference in the radii of curvature, for all vertical motion of the wheel with reference to its neutral position, the member 3 will oscillate in a vertical plane in a direction corresponding to a reduction of the angle of downward setting of the wheel journal so that the point $a$ moves practically on the vertical line $vv'$, and comes to the point $a'$, for instance, $a$ representing the variation of the downward setting angle.

In order to absorb the braking reactions, it is further necessary to rigidly connect the member 3 with a thrust link pivotally mounted near the rear end of the frame, and it will be observed that while the arrangement of the links 6 and 7 is relatively easy to carry out; that of the thrust link will cause great difficulties, due to the fact that its axis of oscillation upon the frame must be in line with the axis of oscillation 8 of the link 7, which is parallel with the axis of the frame, that is, the thrust link must be pivoted to the frame at a point near the middle longitudinal plane of this latter.

The presence of the engine, the necessity of lowering the frame, and the like, often render this method inacceptable, and make it necessary to reduce the length of the link 7 in order to be able to pivot the link 9 upon the side-beam, this reduction in length being effected to the detriment of the proper vertical motion of the wheel 5.

The device according to the invention permits to obviate this drawback, due to the fact that the guiding links 6 and 7 and the thrust link 9 are pivoted to the frame and to the member 3 carrying the journal, upon axes 8, 10, 11, 12, 13, which, for each side of the frame, are parallel with an oblique direction X—X converging towards the front of the frame. Due to this arrangement, the pivot joint 8 may be mounted on the front cross-piece of the frame, and quite near the longitudinal axis Y—Y of the frame, while the joints 12—13 may be mounted on the side-beams of the frame, while at the same time providing a lever arm 1 of great length for the motion of the member 3, at the lower part.

It will be noted that the mounting of the joint 13 does not require the presence of a cross-piece, and that the whole interior of the perimeter of the frame is left free, at the lower part, to place the engine, a casing, a sheet-metal piece, or the like.

The link 6 is preferably situated in a vertical plane perpendicular to the direction X—X.

According to the preferred embodiment of the invention which is shown in the drawings, the member carrying the journal is connected with the frame at the lower part by the guiding link 7 and the thrust link 9, forming a triangle whose imaginary base forms the aforesaid pivoting axis, parallel with the direction X—X, and at the upper part by a link 6 which is perpendicular to the said base X—X, the transverse suspension spring, not shown in Figs. 1 and 2, being independent of the parts connecting the member carrying the journal with the vehicle frame.

It should be observed that in the arrangement in conformity with the invention, which is intended to render the wheel gauge of the vehicle practically constant, the vertical movements of the wheel will occasion not only a variation of the angle of downward setting of the wheels, but also a variation of the wheel base (distance between the front and rear axles). However, by a suitable choice of the dimensions of the parts, a compromise may be made between the variations of the inward setting of the wheels, of the wheel gauge, and wheel base, and these variations may be made negligible within the practical limits of the vertical motion. By observing the proportions of the dimensions shown in the drawings, in a vehicle having normal wheel gauge of 1.44 metres, the variations of the angle of inward setting of the wheels could be reduced to 1 degree, between a position in which the spring was expanded by 40 mm. and a position in which it was compressed by 80 mm. For the mean position and for these two extreme positions, the wheel gauge and the wheel base had their normal values and the difference from this normal value, for the intermediate movements, was ±1 mm. for the wheel gauge, and ±0.3 mm. for the wheel base. By the use of outline drawings, a person skilled in the art will find in each particular case the dimensions which are necessary in order that the variations of the wheel inwards setting, wheel gauge and wheel base may remain within the proposed limits.

Figs. 3 to 6 relate to a form of construction of a front axle in conformity with the invention. The same reference numbers indicate parts corresponding to those of Figs. 1 and 2. The side-beam 1 herein consists of a U iron member to which is welded a sheet metal piece 14, so as to form a tubular cross-section. The front cross-piece 2 comprises an upper U iron member 15, a lower U-shaped pressed member 16, apertured connecting plates 17, and a strengthening plate 17a. At the ends of the upper link 6 are mounted respective forked brackets 18—19 co-operating respectively with a support 18a secured to the side-beam 1 and with the upper end of the member 3 carrying the journal. The pivot joints 11, 12 and 13 may be of any suitable type, such as bearing pivots; but it is preferable to use elastic joints of the "silent-bloc" type. At the outer end of the lower link 7 is a forked bracket 20 co-operating with the lower end of the member 3, and at the inner end is a socket 21, maintained between the vertical sides of the member 16, which are pressed so as to form an obtuse angle, as shown in Fig. 3 in order to provide for the oblique position of the joint 8. This latter is preferably of the "silent bloc" type, while the joint 10 preferably consists of a smooth bearing or a needle bearing, as it is obliged to transmit the wheel-braking couple.

The thrust link 9 consists of a U iron member whose flanges are extended at one end, at 22 and 23 (Fig. 4) in order to fit upon the link 7, the parts being secured by a bolt 24; 25 is the arm of a shock-absorber 26, which may be of the hydraulic type. In the rear, the pivot joint comprises a fitting 27 mounted in the interior of the U iron member 9, a support 28 secured below the side-beam 1, and a "silent bloc" joint, which latter is preferably of a type adapted to resist the axial thrust.

The transverse spring 29, which is preferably of the roller type, is mounted below the cross-piece 2 by means of the usual straps 30. Its end is simply placed in a shackle 31 which consists of a suitable shaped piece of sheet metal (Fig. 6) adapted to fit into a notch 32 in the link 7. The normal deflection of the spring 29 prevents the members from coming apart accidentally.

Due to this arrangement, the lever 7 can move according to a conical surface whose axis is X—X, while at the same time the end of the spring 29 can move in a vertical plane, as there is a slight slipping of the spring in the shackle and a slight pivoting of the shackle on the link 7.

The steering device employed with the said suspension arangement is as follows: The steering link 33, leading from the steering case (not shown), is pivoted by a ball-and-socket joint 34 to the end of a lever 35 which is adapted to pivot on an axle 36 mounted by means of fittings 37—38 in the axis of the vehicle, the ball-and-socket joint 34 being also practically in the plane passing through the pivot 45 of the journal 4 and perpendicular to the direction X—X.

To the lever 35 are pivoted, by ball-and-socket joints 39—40, two half-bars 41—42 for coupling purposes connected with the ball-and-socket joints 46 of the steering levers 43—44 in the known manner, said levers being secured to the journals 4.

It should be noted that the axle 36 of the lever 35 is secured to the framework of the vehicle frame, that is to the suspended part of the vehicle, and thus the vertical movements of the front wheels will have no effect upon the connection made by the link 33 between the steering case and the joint 34.

It is observed that the ball-and-socket joints 34—39—40 are grouped at a point near the intersection of three planes. The first plane passes through the pivot 45 of the journal and is perpendicular to the direction X—X, the second plane is the longitudinal vertical middle plane of the vehicle frame, and the third plane is the plane according to Z—Z (Fig. 2) passing through the joints 8—12—13 of the links on the vehicle frame and on the same side of this latter.

Suitable dimensions of the different parts can be readily chosen in order that the steering arrangement will not be affected by the vertical movements of the wheels. This result cannot be obtained with a rigid coupling bar, which as above stated would assume variable inclinations with reference to the vehicle frame by reason of the unequal vertical movements of the two front wheels, thus causing variations in the angle of forward convergency of the wheels and an oscillation of one wheel relatively to the other.

Obviously, the invention is not limited to the form of construction herein described and represented which is given solely by way of example.

Having now described my invention what I claim as new and desire to secure by Letters Patent is:

1. In a motor vehicle, the combination with a vehicle frame, of a steerable road wheel assembly, means supporting said wheel assembly on said frame for rising and falling movement with respect thereto, said means comprising a pair of laterally extending wheel supporting links, said links being pivotally mounted at their inner ends on said frame for swinging movement about parallel vertically spaced axes, said axes being inclined at an acute angle with respect to the vertical plane containing the longitudinal axis of the vehicle, a member carrying said road wheel assembly for steering movement about a substantially vertical axis and having pivotal connections with said links, and steering mechanism for said wheel assembly, said mechanism comprising an element supported for movement on said frame, an arm carried by said wheel assembly, and an element pivoted to said arm and to said first named element, the point of pivotal connection between said elements lying substantially in the apex of an imaginary right circular cone of which the arc described by said arm during rising and falling movement of the wheel assembly substantially defines the periphery of the base, whereby undesired movement of the wheel assembly about the steering axis thereof is avoided.

2. In a motor vehicle, the combination with a vehicle frame, of a steerable road wheel assembly, means supporting said wheel assembly on said frame for rising and falling movement with respect thereto, said means comprising a pair of laterally extending wheel supporting links, said links being pivotally mounted at their inner ends on said frame for swinging movement about parallel vertically spaced axes, said axes being inclined at an acute angle with respect to the vertical plane containing the longitudinal axis of the vehicle, a member carrying said road wheel assembly for steering movement about a substantially vertical axis and having pivotal connections with said links, and steering mechanism for said wheel assembly, said mechanism comprising a lever movably supported on said frame, an arm carried by said wheel assembly, and a tie rod pivotally connected to said arm and said lever, the point of pivotal connection between said tie rod and said lever lying substantially in the apex of an imaginary right circular cone of which the arc described by said arm during rising and falling movement of the wheel assembly substantially defines the periphery of the base, whereby undesired movement of the wheels about the steering axes thereof is avoided.

3. In a vehicle, a frame, a pair of front wheels, a substantially horizontal spindle for each of said wheels, a supporting member pivotally connected with said spindle about a substantially vertical axis, two lower links connected together and pivoted to the lower part of said member, one of said links being pivoted at a first point situated on the front part of the frame and the other link to the lateral part of said frame at a second point situated rearwardly relatively to said front part, and at a greater distance from the longitudinal axis of the frame than said first point, an upper link pivotally connected to said frame and to the upper part of said member, the pivotal axes of said last named link having substantially the same horizontal angular relation to the longitudinal axis of the frame as the line passing by the two aforesaid points, and spring means connected with said frame and said lower links for resisting upward angular movement of said lower links with respect to the frame, said spring means comprising a transverse laminated spring attached to said frame, and having hook-shaped ends, said spring underlying said front lower link, a recess in said link adjacent the corresponding hook-shaped end and a connecting member engaging said recess and hook-shaped end and having a substantially rectangular aperture adapted to accommodate said spring and said link.

4. In a motor vehicle, the combination with a vehicle frame, of a pair of steerable road wheels disposed at opposite sides of and adjacent one end of the frame, means supporting said wheels for independent substantially vertical movement in arcuate paths about separate axes, said means including a pair of links, one link carrying each of said wheels, each of said links extending transversely of said frame and being pivoted to the latter, and a pair of torque arms extending longitudinally of the frame, each of said torque arms being pivotally connected adjacent the rearward end thereof to the frame and being pivotally connected adjacent the forward end to one of said links for movement relative thereto about a substantially vertical axis only.

5. In a motor vehicle, the combination with a vehicle frame, of a pair of road wheel assemblies disposed at opposite sides of and adjacent one end of the frame, means supporting said wheel assemblies for independent substantially vertical movement in separate arcuate paths, said supporting means including an element operatively connected with each said wheel, said element extending generally transversely of the frame and being pivotally supported on the latter for swinging movement in a substantially vertical plane, and a torque arm extending generally longitudinally of the vehicle and having a direct connection with said element and an articulated connection with said frame, said articulated connection including a rubber sheath interposed between and completely isolating said torque arm and frame to damp vibrations.

6. In a vehicle, a frame embodying a pair of side members and a front cross member, a pair of front wheels, spring means for connecting said wheels to said frame, and, on either side of the vehicle, two respective link means, each embodying a substantially V-shaped lower link whose limbs are respectively pivoted at a first point situated on said cross member and at a second point situated on the corresponding side member, at a greater distance from the symmetry plane of the vehicle than said first point, the pivotal axes of said limbs being substantially aligned, and whose apex is pivoted to the corresponding front wheel, and an upper link pivotally connected with the corresponding side member and to the corresponding front wheel, the pivotal axes of said apex and of said last named link being parallel with said first mentioned axes, said cross member being provided with two vertical bearing flanges arranged on either side of the longitudinal axis of the frame, and each provided with a pair of parallel and opposite plane portions, the two pairs of plane portions converging towards the rear of the frame so as to form an obtuse angle, and the front limb of said V-shaped link being pivotally mounted between the plane portions of the corresponding pair about an axis at right angles to said plane portions.

GEORGES BROULHIET.